April 9, 1957 H. RUDOLPH 2,788,391
FREQUENCY KEYING OF TELEGRAPH APPARATUS
Filed March 2, 1955
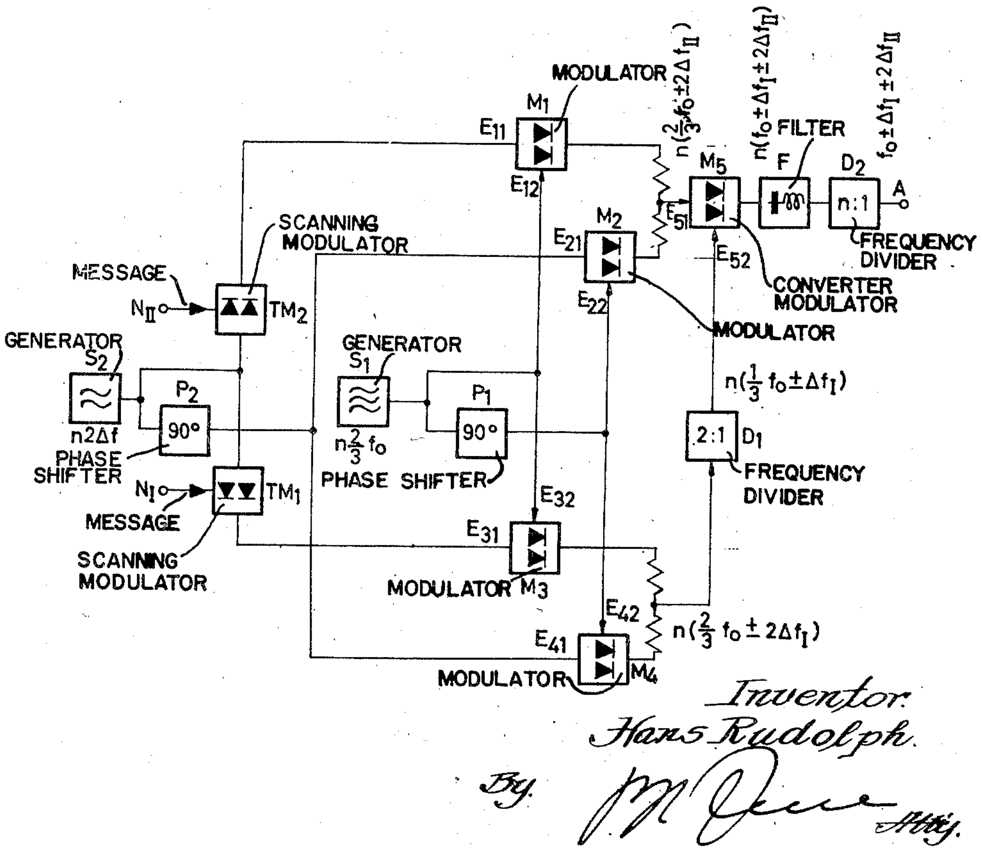
Inventor:
Hans Rudolph
By [signature] Atty.

United States Patent Office 2,788,391

Patented Apr. 9, 1957

2,788,391

FREQUENCY KEYING OF TELEGRAPH APPARATUS

Hans Rudolph, Munich-Solln, Germany, assignor to Siemens & Halske Aktiengesellschaft, Munich and Berlin, Germany, a corporation of Germany Application March 2, 1955, Serial No. 491,600

Claims priority, application Germany April 2, 1954

1 Claim. (Cl. 178—66)

This invention relates to frequency keying of telegraph apparatus for the transmission of two messages, particularly the F1-modulation of wireless telegraph transmitters.

Frequency keying is lately being used to a large extent for transmitting telegraphic messages over wireless channels, especially short wave toll connections, in the form of simple frequency keying and, in twinplex or duoplex operation, in the form of frequency stage-keying.

It is known to connect a reactance tube as an auxiliary capacitance or inductance in parallel with the frequency-determining oscillating circuit for the purpose of keying the frequency of an oscillator in accordance with the timing of the telegraph signals. The telegraph signals are thereby directed to the grid of the reactance tube as control voltages. For the keying in several stages, either the signal voltages of two different messages may be added and used in common as control voltages for a reactance tube or two reactance tubes may be used, one for each of the two messages. In the frequency keying by means of one reactance tube it is above all necessary to stabilize the keying voltages. When high requirements are posed so far as the frequency constancy is concerned, all remaining voltages must likewise be stabilized, and all parts affecting the frequency is any manner must be disposed in a thermostat. Considerable expenditures are required to provide for satisfactory results.

Another known frequency keying method employs a tube oscillator having in addition to the normal feed back coupling path over which a voltage derived from the voltage at the frequency-determining oscillating circuit is conducted to the grid of the oscillator tube, a second feed back coupling path for simple F1-keying over which a voltage derived from the current of the oscillator circuit, the phase of which is accordingly shifted by 90°, is additionally conducted to the grid of an oscillator tube by way of a pole changer, for example, a ring modulator. The operation of the pole changer is controlled by the direct keying current, that is, for example, by twin current telegraph signals. Depending upon the polarization of the additional feed back coupling voltage, the total voltage active at the grid of the tube will be shifted, as compared with the voltage of the oscillator circuit, by a small phase angle in a leading or lagging sense, respectively. The modulator thereby oscillates with a frequency lying about the adjusted amount of frequency variation respectively above or below the harmonic frequency of the oscillating circuit. In the twinplex method, that is, with dual F1-keying, a second auxiliary feed back coupling path is switched in so as to permit keying between four frequencies. The expenditure for the keying modulator is relatively small, but it requires a great deal of tuning work and is not very well adapted for high constancy of the frequency of the produced voltage.

All these known systems require considerable expenditures so as to fulfill the requirements regarding high constancy of the frequencies to be transmitted and of the symmetry of the amount of frequency variation.

Speaking generally, all operating voltages must be stabilized and the frequency-determining parts must be thermally compensated or built into thermostats. In the case of reactance tubes, it is furthermore necessary to stabilize the control voltages.

It is, of course, possible to build highly stable oscillators, for example, by using quartz crystals, but the frequency of such crystals can be affected only with difficulty or only with deterioration of their constancy characteristics. They are accordingly less adapted for frequency keying.

A system frequency-keying for the F1-modulation of wireless transmitters is known wherein the carrier frequency voltage is produced by a preferably stabilized generator while the frequency variation voltage is produed by a further generator the frequency of which is preferably variable, the carrier frequency voltage being modulated with the frequency variation voltage, preferably by the use of modulators which suppress the carrier frequency voltage, and the summation- or difference frequency voltage being alternately suppressed in timing with the control signals.

This system accordingly proceeds in the frequency keying along entirely new paths. While the frequency of a generator had in prior known systems been keyed by the input signals between two values, thus altering the carrier frequency between these two values, the indicated system uses a generator for the unalterable carrier frequency and a generator for producing the frequency variation. By modulating the carrier frequency with the frequency variation, there are simultaneously produced the two frequency values between which the generator is keyed in the known systems, and the frequency keying is effected by suppressing one or the other of these two frequencies. Since the frequency of the output voltage is substantially determined by the carrier frequency, a carrier frequency generator may be advantageously used which is highly stable, for example, a quartz controlled generator. The amount of frequency variation $\Delta f$ will usually be very small as compared with the carrier frequency $f_0$, and correspondingly reduced requirements may accordingly be placed on the second generator so far as the constancy and accuracy of its frequency are concerned. This generator is advantageously made variable so as to permit by variation of its frequency easy and accurate adjustment of the amount of frequency variation.

In the customary multistage frequency keying methods or systems, the so-called twinplex- or duoplex methods, the transmitted oscillation alternates between four frequencies, namely $f_0 \pm \Delta f_I \pm \Delta f_{II}$. As is thereby customary, $\Delta f_I = 200$ cycles and $\Delta f_{II} = 400$ cycles. A highly stable oscillator may be more easily changed by a small frequency amount than by a large amount, and the carrier frequency oscillator can accordingly be keyed in known manner with a smaller amount of frequency variation $\Delta f_I$. The second frequency stage $\Delta f_{II}$ may then be added. The carrier frequency oscillator would then be frequency keyed with the first message and its output voltages would be frequency modulated with the second message. However, this would require a keyed oscillator and a further oscillator for the frequency modulation of the second message.

It is however also possible to connect in series relationship two of the indicated arrangements wherein one is controlled by the first and the other by the second message. The corresponding system would require a considerable expenditure of switching means.

The invention proposes a system for frequency keying depending upon two messages and requiring for F-1 keying of a carrier frequency only two oscillators which oscillate during operation with constant frequency.

An example of the invention will now be described with reference to the accompanying drawing.

In the system according to the invention, a voltage ($n\frac{2}{3}f_0$) with a frequency $n$ which is $\frac{2}{3}$ of the carrier frequency ($f_0$) is modulated in a first modulator $M_3$ with a voltage ($n2\Delta f$) having a frequency amounting to twice ($2n$) the amount of frequency variation ($\Delta f$) and both voltages after phase shift of 90° are modulated in a second modulator $M_4$. One of the modulator input voltages is phase shifted by 180° by a scanning modulator $TM_1$ which is controlled by one message (I), in timing with such message (I), and the sum and difference voltages of the modulators $M_3$ and $M_4$ are jointly conducted over a frequency divider with a ratio of 2:1 to the input of a converter modulator $M_5$. The voltage having a frequency $n$ which is $\frac{2}{3}$ of the carrier frequency ($f_0$) is modulated in a third modulator $M_1$ with the voltage having a frequency amounting to twice ($2n$) of the frequency variation $\Delta f$, and after 90° phase shift both voltages are modulated in a fourth modulator $M_2$; one of the input voltages of these modulators is phase shifted by 180° by a scanning modulator $TM_2$ controlled by the second message (II), in timing with such second message (II), and the sum and difference voltages of the modulators $M_1$ and $M_2$ are jointly conducted to a further input of the converter modulator $M_5$. The sum and difference frequency voltages $n(f_0 \pm \Delta f_I \pm 2\Delta f_{II})$ are filtered out and divided in a ratio of $n$:1, $n$ being a desired whole number.

The drawing shows an embodiment of a frequency-keying system and means for dual or twin F1-keying (twinplex). Generators $S_1$ and $S_2$ are provided for respectively producing the carrier frequency ($S_1$) and a frequency variation frequency $S_2$. The carrier frequency generator $S_1$ however does not directly deliver the carrier frequency $f_0$ but the frequency $\frac{2}{3}f_0$. The generator $S_2$ delivers the frequency $2\Delta f$, $\Delta f$ corresponding to the amount of frequency variation of ±200 to ±400 cycles usual in twinplex systems and amounting suitably to ±200 cycles. If a frequency divider with a ratio $n$:1 is provided at the output of the arrangement, for reducing the phase variation angles at the keying instant, the frequencies of the generators $S_1$ and $S_2$ may be higher by the fatcor $n$. Such frequency division is provided in the illustrated embodiment.

The scanning modulator $TM_1$ and the modulators $M_3$ and $M_4$ serve for the keying of the message I. Similar devices, namely, the scanning modulator $TM_2$ and the modulators $M_1$ and $M_2$ serve for keying of the message II. The carrier frequency generator $S_1$ produces the frequency $n\frac{2}{3}f_0$ for keying the message I and such frequency is connected directly to the input $E_{32}$ of the modulator $M_3$ and after a 90° phase shift in the phase shifter $P_1$ to the input $E_{42}$ of the modulator $M_4$. The frequency $n2\Delta f$ produced by the generator $S_2$ is connected over the scanning modulator $TM_1$ (controlled by the message I at its input $N_1$) to the input $E_{31}$ of the modulator $M_3$, and after a 90° phase shift in the phase shifter $P_2$ to the input $E_{41}$ of the modulator $M_4$. The outputs of the modulators $M_3$ and $M_4$ are connected together over suitable decoupling resistors and the latter are connected with the input of a frequency divider $D_1$. At the input of this frequency divider which is assumed to have a ratio of 2:1 will thus appear the frequency $n(\frac{2}{3}f_0 \pm 2\Delta f_I)$. The sign of $2\Delta f_I$ is changed by the scanning modulator $TM_1$ in accordance with the message I controlling the operation thereof. At the output of the frequency divider $D_1$ appears the frequency $n(\frac{1}{3}f_0 \pm \Delta f_I)$. This output voltage is conducted to the input $E_{52}$ of the converter modulator $M_5$.

The modulation of the message II is carried out in corresponding manner. The output voltage of the generator $S_1$ is for this purpose conducted directly to the input $E_{12}$ of the modulator $M_1$ and after 90° phase shift in the phase shifter $P_1$ to the input $E_{22}$ of the modulator $M_2$. The output voltage of the generator $S_2$ is conducted to the scanning modulator $TM_2$, which is controlled by the message II at its input $N_{II}$, and from there to the input $E_{11}$ of the modulator $M_1$, and after 90° phase shift in the phase shifter $P_2$ to the input $E_{21}$ of the modulator $M_2$. The outputs of the modulators $M_1$ and $M_2$ are connected over decoupling resistors to the input $E_{51}$ of the converter modulator $M_5$. At this input of the modulator appears the frequency $n(\frac{2}{3}f_0 \pm 2\Delta f_{II})$ and since there is, as described before, at its other input $E_{52}$ the frequency $n(\frac{1}{3}f_0 \pm \Delta f_I)$, there will appear at its output the modulation product $n(f_0 \pm \Delta f_I \pm 2\Delta f_{II})$. The voltage of this frequency will be filtered by the filter F and conducted to the frequency divider $D_2$ having a ratio of $n$:1. At the output of this frequency divider will then appear a voltage with the frequency $f_0 \pm \Delta f_I \pm 2\Delta f_{II}$. This latter expression signifies the known output frequencies in twinplex systems, $f_0$ signifying the carrier frequency, $\pm\Delta f_I$ the amount of frequency variation produced by the message I and $\pm 2\Delta f_{II}$ the amount of frequency variation produced by the message II.

Changes may be made within the scope and spirit of the appended claim.

I claim:

In a system for frequency keying two telegraph messages to be transmitted, apparatus for modulating a carrier frequency with a frequency corresponding to the amount of frequency variation and for alternately suppressing the sum and the frequency difference voltages in timing with the control signals, said apparatus comprising a first generator for producing a first voltage with a frequency corresponding to two-thirds of a carrier frequency, a second generator for producing a second voltage with a frequency corresponding to twice the amount of frequency variation, first modulator means for modulating said first voltage with said second voltage, phase shifter means for shifting the phase of both voltages by 90°, a second modulator for modulating said phase shifted voltages, a first scanning modulator controlled by one of said messages for shifting one of said voltages conducted to said first and said second modulators in timing with such first message by 180°, a frequency divider having a ratio of 2:1 for receiving the sum and the difference frequencies from said first and said second modulators, a converter modulator having two input means, means for conducting to one of said input means of said converter modulator said sum and said difference frequencies from said frequency divider, a third modulator for modulating said frequency corresponding to two-thirds of the carrier frequency with the frequency corresponding to twice said variation frequency, a fourth modulator for modulating both said voltages after phase shift thereof by 90°, a second scanning modulator controlled by the other one of said messages for shifting one of said frequencies conducted to said third and fourth modulators in timing with said other message by 180°, means for conducting the sum and difference frequency voltages from said third and fourth modulators to the other input means of said converter modulator, filter means connected with said converter modulator for filtering out the sum and difference frequency voltages, and frequency divider means having a ratio of $n$:1 and connected with said filter means for dividing the resulting frequencies, $n$ in said last-named ratio representing a desired whole number.

References Cited in the file of this patent

UNITED STATES PATENTS

| | | |
|---|---|---|
| 2,486,041 | Leroy | Oct. 25, 1949 |
| 2,654,025 | Higgins | Sept. 29, 1953 |
| 2,674,653 | Rudolph et al. | Apr. 6, 1954 |
| 2,689,881 | Leypold | Sept. 21, 1954 |

FOREIGN PATENTS

| | | |
|---|---|---|
| 646,436 | Great Britain | Nov. 22, 1950 |